United States Patent [19]

Huber et al.

[11] 4,001,453
[45] Jan. 4, 1977

[54] SWEETENING COMPOSITIONS

[75] Inventors: Ulrich Huber, Zurich; Nicolas Kosslakoff, Dubendorf; Bruno Vaterlaus, Feldmeilen, all of Switzerland

[73] Assignee: Givaudan Corporation, Clifton, N.J.

[22] Filed: Sept. 19, 1974

[21] Appl. No.: 507,659

[30] Foreign Application Priority Data

Oct. 5, 1973   Switzerland ............. 14249/73
Aug. 14, 1974  Switzerland ............. 11131/74

[52] U.S. Cl. ................... 426/533; 426/538; 426/548; 426/650
[51] Int. Cl.$^2$ ........................... A23L 1/22
[58] Field of Search ......... 426/217, 213, 533, 534, 426/538, 548, 650, 658; 260/490

[56] References Cited

UNITED STATES PATENTS

| | | | |
|---|---|---|---|
| 3,087,821 | 4/1963 | Horowitz | 426/217 |
| 3,653,923 | 4/1972 | Ishii et al. | 426/217 |
| 3,684,529 | 8/1972 | Liggett | 426/217 |
| 3,739,064 | 6/1973 | Rizzi | 426/217 |
| 3,743,518 | 7/1973 | Eisenstadt | 426/217 |

*Primary Examiner*—Hiram H. Bernstein
*Attorney, Agent, or Firm*—Thomas Cifelli, Jr.

[57] ABSTRACT

Sweetening compositions with substantially instantaneous effect are made with a mixture of certain dihydrochalcones and agents such as gluconodelta-lactone, or gluconic acid or physiologically acceptable salts of such agents.

8 Claims, No Drawings

SWEETENING COMPOSITIONS

FIELD OF THE INVENTION

This invention relates to the field of sweetening agents.

PRIOR ART

Sweetening compositions consisting essentially of at least 50 percent of an edible salt of saccharin in admixture with about 5–25 percent of glucono delta lactone and about 5–25 percent of sodium gluconate, having no bitter after taste are disclosed in U.S. Pat. No. 3,684,529.

It is also known that certain dihydrochalcones such as, in particular, neohesperidin dihydrochalcone (formula Ia), naringin dihydrochalcone (formula Ib) and hesperetin dihydrochalcone glucoside (formula Ic)

[Structure: R$^1$O—(aromatic ring with OH)—C(=O)—CH$_2$—CH$_2$—(aromatic ring with OR$^2$ and R$^3$), with OH on first ring]

|    | R$^1$ | R$^2$ | R$^3$ |
|----|-------|-------|-------|
| Ia | β-Neohesperidosyl | CH$_3$ | OH |
| Ib | β-Neohesperidosyl | H | H |
| Ic | β-Glucosyl | CH$_3$ | OH | have a very sweet taste and are accordingly of interest as artificial sweetening agents [see, for example, J. Agr. Food Chem. 17 (1969), 696].

The sweetening agents of the dihydrochalcone type, such as the compounds Ia, Ib and Ic hereinbefore, are associated with the disadvantage that their sweetening action occurs with a certain delay, with the result that in the consumption of foods or drinks sweetened with such dihydrochalcones the sweet taste is only fully experienced after the other organoleptic sensations characteristic of the foods and drinks in question are already dying away or have even completely died away.

SUMMARY OF THE INVENTION

It has now surprisingly been found in accordance with the present invention that the aforementioned undesirable delay in the onset of the sweetening action can be prevented by the addition of glucono-δ-lactone, especially D(+)-gluconic acid δ-lactone, gluconic acid, especially D(+)-gluconic acid, or a physiologically acceptable salt thereof. By this means, the sweetening action occurs practically at the same time as the sweetening action of saccharose.

The present invention is based on the foregoing finding and is accordingly concerned with a sweetening composition which consists of or contains a dihydrochalcone sweetening agent as the artificial sweetening agent and glucono-δ-lactone, gluconic acid or a physiologically acceptable salt thereof as a delay inhibitor.

DESCRIPTION OF THE PREFERRED EMBODIMENTS

As dihydrochalcone sweetening agents within the scope of the present invention there can be mentioned, in particular, the foregoing dihydrochalcones Ia, Ib and Ic, the dihydrochalcone Ia (neohesperidin dihydrochalcone) being of particular interest.

As physiologically acceptable salts of gluconic acid there can be mentioned, in particular, the alkali metal salts such as the sodium and potassium salts and the alkaline earth metal salts such as the calcium salt.

The ratio of dihydrochalcone to glucono-δ-lactone, gluconic acid or a physiologically acceptable salt thereof can vary within wide limits. However, at least 2 parts by weight of glucono-δ-lactone, gluconic acid or a physiologically acceptable salt thereof are expediently present per part by weight of dihydrochalcone sweetening agent. The weight ratios of dihydrochalcone sweetening agent to glucono-δ-lactone, gluconic acid or a physiologically acceptable salt thereof preferably lie in the range of about 1:2 to 1:30, most preferably between about 1:3 and 1:15.

The dihydrochalcone concentration in the product to be sweetened (e.g. food or drink) depends, of course, not only on the sweetening power (degree of sweetening or sweetening value) of the dihydrochalcone sweetening agent used and the organoleptic properties of the product to be sweetened but also on how sweet the product is to finally taste. In general, the desired sweetening effect can be produced with concentrations of 5–1000 ppm of dihydrochalcone.

The sweetening compositions provided by the present invention can be used for sweetening a very wide variety of products. Thus, they can be used for sweetening any product which can also be sweetened or improved in flavour using other known artificial sweetening agents (saccharin, cyclamate etc). Examples of such products are solid and liquid foods and beverages such as milk products (yoghurt, curd foods, milk drinks, sherbert), coffee, tea, cocoa, instant drinks, lemonades, fruit juices, fruit juice drinks, alcoholic drinks (aperitifs, bitters, liqueurs), baked goods (confection, cakes), confectioneries (sweets, jellies, chocolates, pralines) and chewing gum. Examples of other products which can be sweetened using the present compositions are feedstuffs, pharmaceutical and cosmetic preparations (e.g. oral hygiene agents).

The sweetening compositions provided by the present invention can be used to sweeten products in a manner known per se; for example, by admixture with the product to be sweetened in the form of powders, cubes, tablets or solutions and, if desired, in combination with the usual carrier materials and adjuvants (e.g. bicarbonates, carbohydrates etc). The present sweetening composition can also contain other sweetening agents such as, for example, glucose, saccharose, fructose, xylitol, maltitol, sorbitol, saccharin or cyclamate.

The following Examples illustrate the present invention:

EXAMPLE 1

| Drink having a grapefruit aroma: | | |
|---|---|---|
| 50% aqueous solution of citric acid | | 4.5 ml |
| Naringin | | 200 mg |
| D(+)-Gluconic acid δ-lactone | | 100 mg |
| Neohesperidin dihydrochalcone | | 30 mg |
| Synthetic grapefruit aroma | | 10 mg |
| Drinking water | ad | 1000 ml |

The resulting drink has a pleasant bitter-sweet, grapefruit-like taste. The same formulation without the D(+)-gluconic acid δ-lactone has an insufficiently sweet taste.

EXAMPLE 2

| Drink having a grapefruit aroma: | | |
|---|---|---|
| Saccharose | 30 | g |
| Orange cloudifier (turbidifier) | 8 | g |
| Pectin | 5 | g |
| 50% aqueous solution of citric acid | 4.5 | ml |
| Naringin | 200 | mg |
| Naringin dihydrochalcone | 75 | mg |
| Sodium gluconate | 400 | mg |
| Synthetic grapefruit aroma | 10 | mg |
| Drinking water ad | 1000 | ml |

The resulting drink has a pleasant bitter-sweet grapefruit-like taste. The same formulation without the sodium gluconate has an insufficiently sweet taste. The foregoing formulation can contain 400 mg of gluconic acid in place of the sodium gluconate.

EXAMPLE 3

| Raspberry yoghurt: | | |
|---|---|---|
| Whole milk | 940 | g |
| Skim milk powder | 10 | g |
| Saccharose | 50 | g |
| Neohesperidin dihydrochalcone | 30 | mg |
| D(+)-Gluconic acid δ-lactone | 0.4 | g |

2.5% yoghurt culture is added to the foregoing mixture. After incubation, there is obtained a fruit yoghurt having a pleasant sweet taste. The same formulation without the D(+)-gluconic acid δ-lactone has an insufficiently sweet taste.

What we claim is:

1. A sweetening composition which comprises a dihydrochalcone sweetening agent selected from the group consisting of neohesperidin dihydrochalcone, naringin dihydrochalcone and hesperetin dihydrochalcone glucoside, and at least two parts by weight of an additive which is a member of the group consisting of glucono-delta-lactone and gluconic acid, or a physiologically acceptable salt of either of said members, per each part by weight of said sweetening agent, whereby the sweetening effect of said agent becomes apparent substantially instantly.

2. An edible composition containing a sweetening composition in accordance with claim 1.

3. A sweetening composition in accordance with claim 1, wherein said additive is sodium gluconate and said sweetening agent is naringin dihydrochalcone.

4. A sweetening composition in accordance with claim 1 wherein said additive is glucono-delta-lactone.

5. A sweetening composition in accordance with claim 1 wherein the sweetening agent is neohesperidin dihydrochalcone.

6. An edible composition containing a sweetening composition in accordance with claim 3.

7. An edible composition containing a sweetening composition in accordance with claim 4.

8. An edible composition containing a sweetening composition in accordance with claim 5.

* * * * *